United States Patent
Burke

(10) Patent No.: US 11,506,284 B1
(45) Date of Patent: Nov. 22, 2022

(54) MULTI-PAWL PARK LOCK

(71) Applicant: Schaeffler Technologies AG & Co. KG, Herzogenaurach (DE)

(72) Inventor: Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/328,148

(22) Filed: May 24, 2021

(51) Int. Cl.
*F16H 63/34* (2006.01)

(52) U.S. Cl.
CPC ................ *F16H 63/3425* (2013.01)

(58) Field of Classification Search
CPC ............ F16H 63/3416–3491; F16D 41/12–16
See application file for complete search history.

(56) References Cited

U.S. PATENT DOCUMENTS 71,762 A * 12/1867 Huson ................. F16D 41/12
74/156
6,299,562 B1 * 10/2001 Kim ..................... B60K 23/08
475/221
9,157,528 B2 * 10/2015 Corsetti ................. B60K 6/48
11,371,607 B2 * 6/2022 Stöhr ..................... B60T 7/104

FOREIGN PATENT DOCUMENTS

CN 106090068 A * 11/2016
DE 19834075 A1 * 2/2000 .............. B60T 1/005
FR 3059387 A1 * 6/2018

* cited by examiner

*Primary Examiner* — David R Morris
*Assistant Examiner* — James J Taylor, II

(57) ABSTRACT

A multi-pawl park lock includes a gear wheel, an actuation ring, a first pawl, a second pawl, and first and second strut rods. The first pawl includes a first tooth and the second pawl includes a second tooth. The strut rods connect the actuation ring to respective pawls. The actuation ring is arranged to rotate in a first rotational direction to rotate the first pawl about a first pawl axis and engage the first tooth with the gear wheel, and rotate the second pawl about a second pawl axis and engage the second tooth with the gear wheel, preventing rotation of the gear wheel. The actuation ring is also arranged to rotate in a second rotational direction, opposite the first rotational direction, to rotate the first pawl and disengage the first tooth, and rotate the second pawl and disengage the second tooth, permitting rotation of the gear wheel.

20 Claims, 2 Drawing Sheets

MULTI-PAWL PARK LOCK

TECHNICAL FIELD

The present disclosure relates generally to a park lock, and more specifically to a multi-pawl park lock.

BACKGROUND

Known transmission park lock mechanisms are upstream of a final drive ratio and/or a transmission ratio. This reduces the torque on the park lock. Electric axles with park lock mechanisms on output shafts may see higher torque.

SUMMARY

Example embodiments broadly comprise a multi-pawl park lock with an axis, a gear wheel, rotatable about the axis, an actuation ring, coaxial with the gear wheel, a first pawl, a second pawl, a first strut rod and a second strut rod. The gear wheel has a castellated outer diameter, the first pawl is rotatable about a first pawl axis, radially offset from the axis, and includes a first tooth, and the second pawl is rotatable about a second pawl axis, radially offset from the axis and circumferentially offset from the first pawl axis, and includes a second tooth. The first strut rod connects the actuation ring to the first pawl, and the second strut rod connects the actuation ring to the second pawl. The actuation ring is arranged to rotate about the axis in a first rotational direction to displace the first strut rod to rotate the first pawl and engage the first tooth with the castellated outer diameter, and displace the second strut rod to rotate the second pawl and engage the second tooth with the castellated outer diameter, preventing rotation of the gear wheel. The actuation ring is also arranged to rotate about the axis in a second rotational direction, opposite the first rotational direction, to displace the first strut rod to rotate the first pawl and disengage the first tooth from the castellated outer diameter, and displace the second strut rod to rotate the second pawl and disengage the second tooth from the castellated outer diameter, permitting rotation of the gear wheel.

In an example embodiment, the first pawl and the second pawl are arranged about the axis circumferentially opposite one another. In an example embodiment, the castellated outer diameter includes alternating pockets and protrusions, the first strut rod includes a first strut spring, and the second strut rod includes a second strut spring. The first strut spring is compressed when the actuation ring is rotated in the first rotational direction and the first tooth is aligned with one of the protrusions, the first strut spring is arranged to further rotate the first pawl after a rotation of the gear wheel that aligns the first tooth with a one of the pockets, the second strut spring is compressed when the actuation ring is rotated in the second rotational direction and the second tooth is aligned with another one of the protrusions, and the second strut spring is arranged to further rotate the second pawl after a rotation of the gear wheel that aligns the second tooth with another one of the pockets.

In some example embodiment, the first pawl includes a first strut pin, the second pawl includes a second strut pin, the actuation ring includes a first actuation ring pin and a second actuation ring pin, the first strut rod is connected to the first strut pin and the first actuation ring pin, and the second strut rod is connected to the second strut pin and second actuation ring pin. In some example embodiments, the first strut rod includes a first slot and the first strut pin or the first actuation ring pin is arranged in the first slot, and the second strut rod includes a second slot and the second strut pin or the second actuation ring pin is arranged in the second slot. In some example embodiments, the first strut rod includes a first strut spring installed in the first slot, and the second strut rod includes a second strut spring installed in the second slot.

In some example embodiments, the first strut pin is installed in the first slot, the first pawl retains the first strut spring in a first axial direction, the second strut pin is installed in the second slot, and the second pawl retains the second strut spring in the first axial direction. In an example embodiment, the first strut rod further includes a first spring cover, attached to the first strut pin and slidable along the first strut rod, the first spring cover axially retains the first spring in a second axial direction, opposite the first axial direction, the second strut rod further includes a second spring cover, attached to the second strut pin and slidable along the second strut rod, and the second spring cover axially retains the second spring in the second axial direction.

In some example embodiments, the actuation ring includes a first radially extending protrusion and a second radially extending protrusion, the first actuating ring pin is installed in the first radially extending protrusion, and the second actuating ring pin is installed in the second radially extending protrusion. In an example embodiment, the actuation ring includes an actuation protrusion extending from the first radially extending protrusion for connecting to an actuator arranged to rotate the actuation ring.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
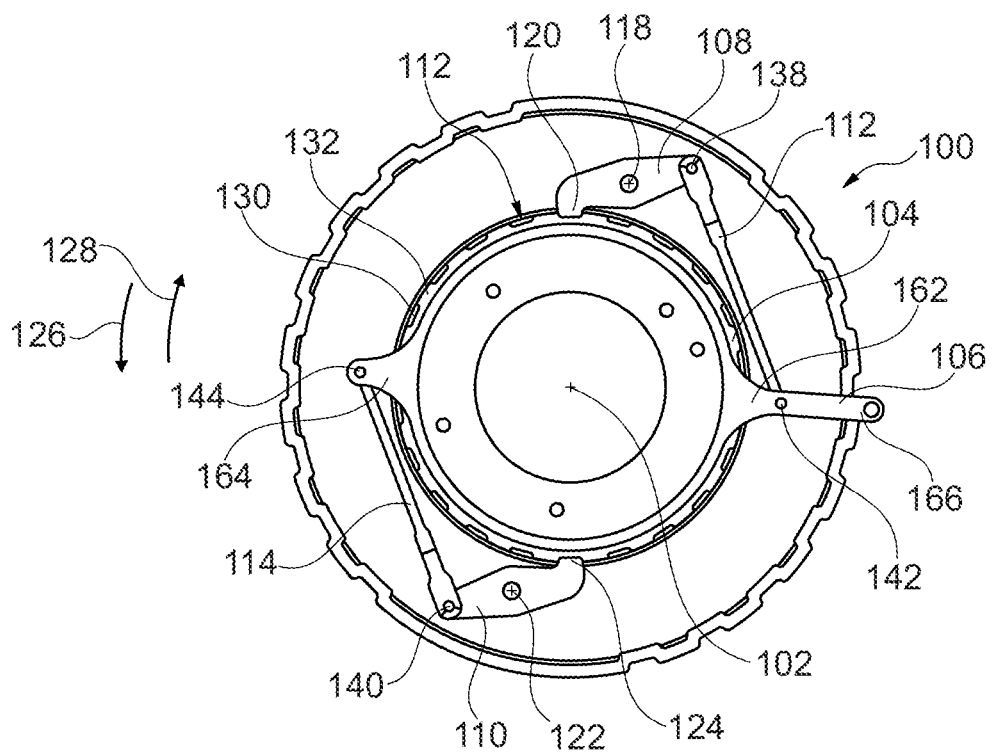
FIG. 1 illustrates a front view of a multi-pawl park lock according to an example embodiment.
Figure 2:
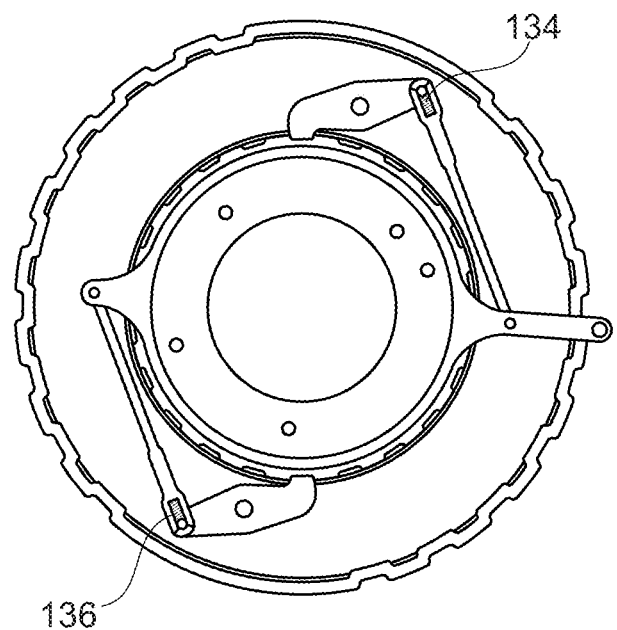
FIG. 2 illustrates a front view of the multi-pawl park lock of FIG. 1 with spring covers removed.

The following description is made with reference to FIGS. 1-2. FIG. 1 illustrates a front view of a multi-pawl park lock according to an example embodiment. FIG. 2 illustrates a front view of the multi-pawl park lock of FIG. 1 with spring covers removed. Multi-pawl park lock 100 includes axis 102, gear wheel 104, actuation ring 106 coaxial with the gear wheel, pawl 108, pawl 110, strut rod 112 connecting the actuation ring to pawl 108, and strut rod 114 connecting the actuation ring to pawl 110. The gear wheel is rotatable about the axis and includes castellated outer diameter 116. Pawl 108 is rotatable about pawl axis 118, radially offset from axis 102, and includes tooth 120. Pawl 110 is rotatable about pawl axis 122, radially offset from axis 102 and circumferentially offset from pawl axis 118, and includes second tooth 124.

Actuation ring 106 is arranged to rotate about the axis in rotational direction 126 to displace strut rod 112 to rotate pawl 108 and engage tooth 120 with the castellated outer diameter, and displace the strut rod 114 to rotate pawl 110 and engage the tooth 124 with the castellated outer diameter, preventing rotation of the gear wheel. That is, pawl axes 118 and 122 are fixed so that translation of the pawls is fixed and, when the teeth engage the castellated outer diameter, the translationally fixed pawls prevent rotation of the gear wheel, Actuation ring 106 is also arranged to rotate about the axis in rotational direction 128, opposite rotational direction 126, to displace strut rod 112 to rotate pawl 108 and disengage tooth 120 from the castellated outer diameter, and displace strut rod 114 to rotate the pawl 110 and disengage tooth 124 from the castellated outer diameter, permitting rotation of the gear wheel.

Pawl 108 and pawl 110 are arranged about the axis circumferentially opposite one another. Although two pawls are shown, any number of pawls and strut rods may be employed, depending on the torque requirements of the park lock. For example, three or four pawls and strut rods may be evenly distributed radially outside the gear wheel, with respective pawl axes arranged at about a circumference coaxial with the gear wheel and actuation ring.

Castellated outer diameter 116 includes alternating pockets 130 and protrusions 132, strut rod 112 includes strut spring 134, and strut rod 114 includes strut spring 136 (ref. FIG. 2). Strut spring 134 is compressed when the actuation ring is rotated in rotational direction 126 and the tooth 120 is aligned with one of the protrusions, and strut spring 134 is arranged to further rotate the pawl 108 after a rotation of the gear wheel that aligns tooth 120 with a one of the pockets. Similarly, strut spring 136 is compressed when the actuation ring is rotated in rotational direction 128 and tooth 124 is aligned with another one of the protrusions, and strut spring 136 is arranged to further rotate pawl 110 after a rotation of the gear wheel that aligns tooth 124 with another one of the pockets.

Pawl 108 includes strut pin 138 and pawl 110 includes strut pin 140. Actuation ring 106 includes actuation ring pin 142 and actuation ring pin 144. Strut rod 112 is connected to the strut pin 138 and actuation ring pin 142, and strut rod 114 is connected to strut pin 140 and the actuation ring pin 144. Strut rod 112 includes slot 146 and strut pin 138 is arranged in slot 146. Similarly, strut rod 114 includes slot 148 and strut pin 140 is arranged in slot 148. Although pin 138 is shown in slot 146 and pin 140 is shown in slot 148, other embodiments may include strut rods 112 and 114 oriented such that actuation ring pin 142 is arranged in slot 146 and actuation ring pin 144 is arranged in slot 148. Slots 146 and 148 allow displacement of the actuation rods (or displacement of the actuation ring without displacing the actuation rods when the actuation ring pins are arranged in the slots) when the teeth are aligned with the gear wheel protrusions as described above.

Figure 3:
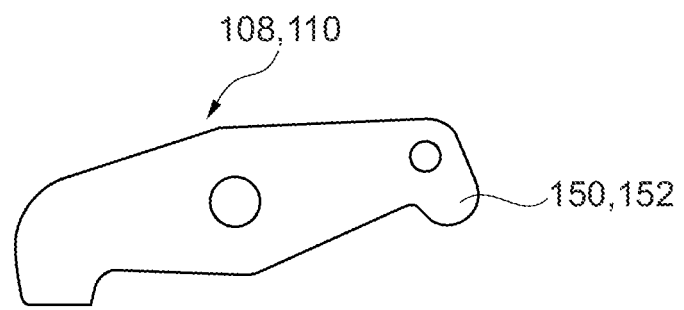
FIG. 3 illustrates a front view of a pawl of the multi-pawl park lock of FIG. 1.
Figure 4:
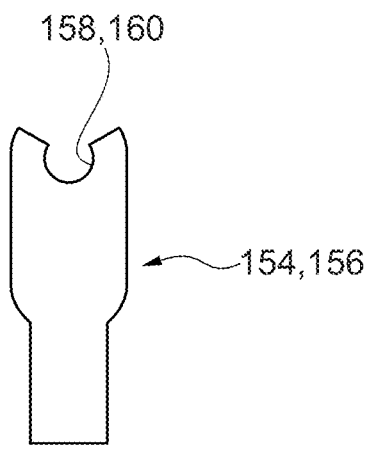
FIG. 4 illustrates a front view of a spring cover of the multi-pawl park lock of FIG. 1.
Figure 5:
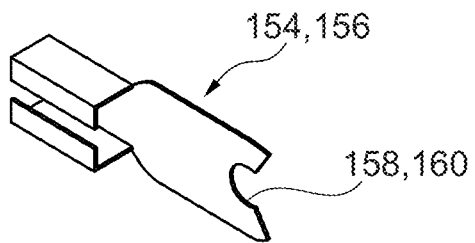
FIG. 5 illustrates a perspective view of the spring cover of FIG. 4.

The following description is made with reference to FIGS. 1-5. FIG. 3 illustrates a front view of a pawl of the multi-pawl park lock of FIG. 1. FIG. 4 illustrates a front view of a spring cover of the multi-pawl park lock of FIG. 1. FIG. 5 illustrates a perspective view of the spring cover of FIG. 4. As best seen in FIG. 2, strut rod 112 includes strut spring 134 installed in slot 146, and strut rod 114 includes strut spring 136 installed in slot 116. Pawl 108 retains strut spring 134 in a first axial direction and pawl 110 retains strut spring 136 in the first axial direction. As can be seen in FIG. 3, pawls 108 and 110 include respective extensions for axially retaining strut springs 134 and 136, respectively. Strut rod 112 includes spring cover 154 attached to strut pin 138 and slidable along strut rod 112, and strut rod 114 includes spring cover 156 attached to strut pin 140 and slidable along strut rod 114. Spring cover 154 axially retains strut spring 134 in a second axial direction, opposite the first axial direction, and spring cover 156 axially retains strut spring 136 in the second axial direction. As can be seen in FIGS. 4-5, spring covers 154, 156 include snap-fit ends 158, 160 that clip onto respective strut pins 138, 140.

Actuation ring 106 includes radially extending protrusion 162 and radially extending protrusion 164. Actuating ring pin 142 is installed in radially extending protrusion 162 and actuating ring pin 144 is installed in radially extending protrusion 164. Actuation ring 106 includes actuation protrusion 166 extending from radially extending protrusion 162 for connecting to an actuator (not shown) arranged to rotate the actuation ring.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Reference Numerals

100 Multi-pawl park lock
102 Axis
104 Gear wheel
106 Actuation ring
108 Pawl (first)
110 Pawl (second)
112 Strut rod (first)
114 Strut rod (second)
116 Castellated outer diamter
118 Pawl axis (first)
120 Tooth (first)
122 Pawl axis (second)
124 Tooth (second)
126 Rotational direction (first)
128 Rotational direction (second)
130 Pockets (gear wheel)
132 Protrusions (gear wheel)
134 Strut spring (first)
136 Strut spring (second)
138 Strut pin (first)
140 Strut pin (second)
142 Actuation ring pin (first)
144 Actuation ring pin (second)
146 Slot (first)
148 Slot (second)
150 Extension (first pawl)
152 Extension (second pawl)
154 Spring cover (first)
156 Spring cover (second)
158 Snap-fit end (first spring cover)
160 Snap-fit end (second spring cover)
162 Radially extending protrusion (first)
164 Radially extending protrusion (second)

What is claimed is:

1. A multi-pawl park lock, comprising:
an axis;
a gear wheel, rotatable about the axis, and comprising outer teeth;
an actuation ring, coaxial with the gear wheel;
a first pawl, rotatable about a first pawl axis, radially offset from the axis, and comprising a first tooth;
a second pawl, rotatable about a second pawl axis, radially offset from the axis and circumferentially offset from the first pawl axis, and comprising a second tooth;
a first strut rod pivotably connecting the actuation ring to the first pawl; and
a second strut rod pivotably connecting the actuation ring to the second pawl, wherein the actuation ring is arranged to:
rotate about the axis in a first rotational direction to displace the first strut rod to rotate the first pawl and engage the first tooth with a first one of the outer teeth, and displace the second strut rod to rotate the second pawl and engage the second tooth with a second one of the outer teeth, preventing rotation of the gear wheel; and
rotate about the axis in a second rotational direction, opposite the first rotational direction, to displace the first strut rod to rotate the first pawl and disengage the first tooth from the first one of the outer teeth, and displace the second strut rod to rotate the second pawl and disengage the second tooth from the second one of the outer teeth, permitting rotation of the gear wheel.

2. The multi-pawl park lock of claim 1 wherein the first pawl and the second pawl are arranged about the axis circumferentially opposite one another.

3. The multi-pawl park lock of claim 1 wherein:
the outer teeth comprise alternating pockets and protrusions;
the first strut rod comprises a first strut spring;
the second strut rod comprises a second strut spring;
the first strut spring is compressed when the actuation ring is rotated in the first rotational direction and the first tooth is aligned with one of the protrusions;
the first strut spring is arranged to further rotate the first pawl after a rotation of the gear wheel that aligns the first tooth with a one of the pockets;
the second strut spring is compressed when the actuation ring is rotated in the second rotational direction and the second tooth is aligned with another one of the protrusions; and
the second strut spring is arranged to further rotate the second pawl after a rotation of the gear wheel that aligns the second tooth with another one of the pockets.

4. The multi-pawl park lock of claim 1 wherein:
the first pawl comprises a first strut pin;
the second pawl comprises a second strut pin;
the actuation ring comprises a first actuation ring pin and a second actuation ring pin;
the first strut rod is connected to the first strut pin and the first actuation ring pin; and
the second strut rod is connected to the second strut pin and the second actuation ring pin.

5. The multi-pawl park lock of claim 4 wherein:
the first strut rod comprises a first slot and the first strut pin or the first actuation ring pin is arranged in the first slot; and
the second strut rod comprises a second slot and the second strut pin or the second actuation ring pin is arranged in the second slot.

6. The multi-pawl park lock of claim 5 wherein:
the first strut rod comprises a first strut spring installed in the first slot; and
the second strut rod comprises a second strut spring installed in the second slot.

7. The multi-pawl park lock of claim 6 wherein:
the first strut pin is installed in the first slot;
the first pawl retains the first strut spring in a first axial direction;
the second strut pin is installed in the second slot; and
the second pawl retains the second strut spring in the first axial direction.

8. The multi-pawl park lock of claim 7 wherein:
the first strut rod further comprises a first spring cover, attached to the first strut pin and slidable along the first strut rod;
the first spring cover axially retains the first strut spring in a second axial direction, opposite the first axial direction;
the second strut rod further comprises a second spring cover, attached to the second strut pin and slidable along the second strut rod; and
the second spring cover axially retains the second strut spring in the second axial direction.

9. The multi-pawl park lock of claim 4, wherein:
the actuation ring comprises:
a first radially extending protrusion; and
a second radially extending protrusion;
the first actuation ring pin is installed in the first radially extending protrusion; and the second actuation ring pin is installed in the second radially extending protrusion.

10. The multi-pawl park lock of claim 9 wherein the actuation ring comprises an actuation protrusion extending from the first radially extending protrusion for connecting to an actuator arranged to rotate the actuation ring.

11. The multi-pawl park lock of claim 1, wherein rotation of the actuation ring about the axis in the first rotational direction:
moves the first tooth radially inward to engage the first one of the outer teeth; and
moves the second tooth radially inward to engage the second one of the outer teeth.

12. A multi-pawl park lock, comprising:
an axis;
a gear wheel, rotatable about the axis, and comprising a castellated outer diameter;
an actuation ring, coaxial with the gear wheel;
a first pawl, rotatable about a first pawl axis, radially offset from the axis, and comprising a first tooth;
a second pawl, rotatable about a second pawl axis, radially offset from the axis and circumferentially offset from the first pawl axis, and comprising a second tooth;
a first strut rod connecting the actuation ring to the first pawl; and
a second strut rod connecting the actuation ring to the second pawl, wherein
the actuation ring is arranged to:
rotate about the axis in a first rotational direction to displace the first strut rod to rotate the first pawl and engage the first tooth with the castellated outer diameter, and displace the second strut rod to rotate the second pawl and engage the second tooth with the castellated outer diameter, preventing rotation of the gear wheel; and
rotate about the axis in a second rotational direction, opposite the first rotational direction, to displace the first strut rod to rotate the first pawl and disengage the first tooth from the castellated outer diameter, and displace the second strut rod to rotate the second pawl and disengage the second tooth from the castellated outer diameter, permitting rotation of the gear wheel;
the castellated outer diameter comprises alternating pockets and protrusions;
the first strut rod comprises a first strut spring;
the second strut rod comprises a second strut spring;
the first strut spring is compressed when the actuation ring is rotated in the first rotational direction and the first tooth is aligned with one of the protrusions;
the first strut spring is arranged to further rotate the first pawl after a rotation of the gear wheel that aligns the first tooth with a one of the pockets;
the second strut spring is compressed when the actuation ring is rotated in the second rotational direction and the second tooth is aligned with another one of the protrusions; and
the second strut spring is arranged to further rotate the second pawl after a rotation of the gear wheel that aligns the second tooth with another one of the pockets.

13. The multi-pawl park lock of claim 12 wherein the first pawl and the second pawl are arranged about the axis circumferentially opposite one another.

14. The multi-pawl park lock of claim 12 wherein:
the first pawl comprises a first strut pin;
the second pawl comprises a second strut pin;
the actuation ring comprises a first actuation ring pin and a second actuation ring pin;
the first strut rod is connected to the first strut pin and the first actuation ring pin; and
the second strut rod is connected to the second strut pin and the second actuation ring pin.

15. The multi-pawl park lock of claim 14 wherein:
the first strut rod comprises a first slot and the first strut pin or the first actuation ring pin is arranged in the first slot; and
the second strut rod comprises a second slot and the second strut pin or the second actuation ring pin is arranged in the second slot.

16. The multi-pawl park lock of claim 14, wherein:
the actuation ring comprises:
a first radially extending protrusion; and
a second radially extending protrusion;
the first actuation ring pin is installed in the first radially extending protrusion; and
the second actuation ring pin is installed in the second radially extending protrusion.

17. The multi-pawl park lock of claim 16 wherein the actuation ring comprises an actuation protrusion extending from the first radially extending protrusion for connecting to an actuator arranged to rotate the actuation ring.

18. A multi-pawl park lock, comprising:
an axis;
a gear wheel, rotatable about the axis, and comprising a castellated outer diameter;
an actuation ring, coaxial with the gear wheel;
a first pawl, rotatable about a first pawl axis, radially offset from the axis, and comprising a first tooth;
a second pawl, rotatable about a second pawl axis, radially offset from the axis and circumferentially offset from the first pawl axis, and comprising a second tooth;
a first strut rod connecting the actuation ring to the first pawl; and
a second strut rod connecting the actuation ring to the second pawl, wherein:
the actuation ring is arranged to:
rotate about the axis in a first rotational direction to displace the first strut rod to rotate the first pawl and engage the first tooth with the castellated outer diameter, and displace the second strut rod to rotate the second pawl and engage the second tooth with the castellated outer diameter, preventing rotation of the gear wheel; and
rotate about the axis in a second rotational direction, opposite the first rotational direction, to displace the first strut rod to rotate the first pawl and disengage the first tooth from the castellated outer diameter, and displace the second strut rod to rotate the second pawl and disengage the second tooth from the castellated outer diameter, permitting rotation of the gear wheel;
the first pawl comprises a first strut pin;
the second pawl comprises a second strut pin;
the actuation ring comprises a first actuation ring pin and a second actuation ring pin;
the first strut rod is connected to the first strut pin and the first actuation ring pin; and
the second strut rod is connected to the second strut pin and the second actuation ring pin.
the first strut rod comprises a first slot and the first strut pin or the first actuation ring pin is arranged in the first slot;

the second strut rod comprises a second slot and the second strut pin or the second actuation ring pin is arranged in the second slot;
the first strut rod comprises a first strut spring installed in the first slot; and
the second strut rod comprises a second strut spring installed in the second slot.

19. The multi-pawl park lock of claim 18 wherein:
the first strut pin is installed in the first slot;
the first pawl retains the first strut spring in a first axial direction;
the second strut pin is installed in the second slot; and
the second pawl retains the second strut spring in the first axial direction.

20. The multi-pawl park lock of claim 19 wherein:
the first strut rod further comprises a first spring cover, attached to the first strut pin and slidable along the first strut rod;
the first spring cover axially retains the first strut spring in a second axial direction, opposite the first axial direction;
the second strut rod further comprises a second spring cover, attached to the second strut pin and slidable along the second strut rod; and
the second spring cover axially retains the second strut spring in the second axial direction.

* * * * *